(No Model.)
P. G. SALOM.
SEPARATOR PLATE FOR STORAGE BATTERIES.
No. 533,751.  Patented Feb. 5, 1895.
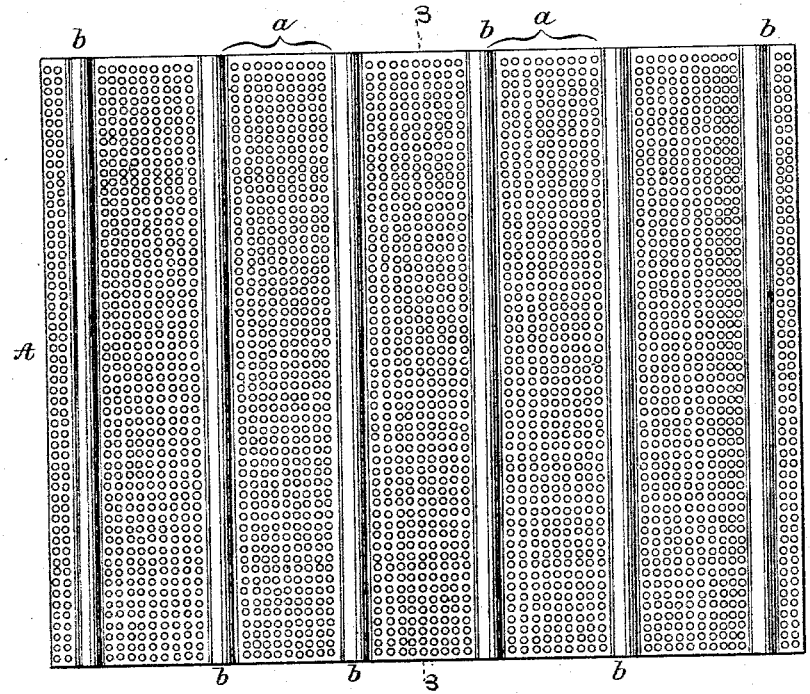
FIG 1
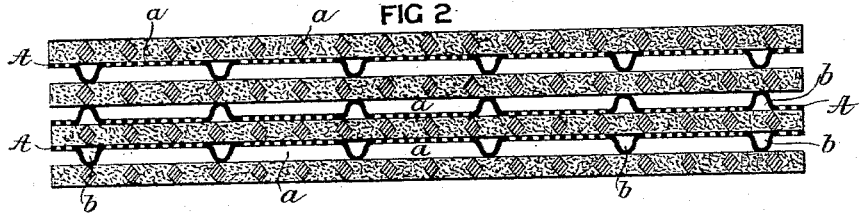
FIG 2
FIG 3
FIG 5
FIG 4
WITNESSES
Chas. Arnon
Will A. Barr
INVENTOR
Pedro G. Salom
By his Attorneys
Howson & Howson

UNITED STATES PATENT OFFICE.

PEDRO G. SALOM, OF PHILADELPHIA, PENNSYLVANIA.

SEPARATOR-PLATE FOR STORAGE-BATTERIES.

SPECIFICATION forming part of Letters Patent No. 533,751, dated February 5, 1895.

Application filed May 9, 1894. Serial No. 510,618. (No model.)

*To all whom it may concern:*

Be it known that I, PEDRO G. SALOM, a citizen of the United States, residing in Philadelphia, Pennsylvania, have invented certain Improvements in Separator-Plates for Storage-Batteries, of which the following is a specification.

The object of my invention is to make a separator for the plates of storage batteries in such a manner that one plate will be thoroughly insulated from another and the active matter in the positive plate will be held in position in the grid but the electrolyte will be free to circulate between the plates. This object I attain in the following manner, reference being had to the accompanying drawings, in which—

Figure 1, is a side view of my improved separator. Fig. 2, is a sectional plan view showing a series of separators mounted between a series of plates of a storage battery. Fig. 3, is a longitudinal section on the line 3—3, Fig. 1. Figs. 4 and 5, are views of modifications of my invention.

I prefer to make the separator of hard rubber, although it will be understood that other nonconducting material may be employed without departing from my invention.

The separator A is preferably flat on one side and has a series of ribs *b* on the opposite side preferably made by crimping the material of the plate, thus forming a series of vertical channels in the flat side of the plate. The portions *a a* between each rib, when the separator is in position, rest against the grid of the positive plate so as to hold the active material in position as the active material of the positive plate is liable to become disengaged and very often short circuiting the battery. The flat portions *a* are perforated with small holes so as to allow the liquid to gain access to the active material of the plate. When the plates are placed in position, as shown in Fig. 2, the flat portion *a* of the separator plates for instance, are placed one on one side of the positive plate and the other on the opposite side, thus holding the material within the grid, the ribs resting against the negative plate. Thus a free channel is formed for the flow of liquid between the separator and the negative plate and the liquid can gain access to the element of the positive plate through the small perforations and by making the ribs hollow, as shown in Fig. 2, circulation may be had in direct contact with the positive plates. I may make the ribs solid, as shown in Fig. 5, without departing from my invention.

In some instances the ribs may be perforated as well as the body portion *a*, as shown in Fig. 4, but I prefer to make the ribs as shown in Fig. 1, as they add strength to the separator and enable me to make the separator of lighter material than would be the case if the ribs were perforated. Thus by my invention I not only separate the plates from one another, and allow the liquid to circulate throughout the series of plates, but I hold the positive element in position with its grid, and the separator being made very light it adds very little to the weight of the battery.

I claim as my invention—

A separator for battery plates made of a sheet of non-conducting material having perforated flat sections one side adapted to rest against a battery plate and having hollow ribs formed by crimping the plate, said ribs being on one side only so as to leave a space between the main body of the separator and the battery plate resting against the ribs, substantially as described.

In testimony whereof I have signed my name to this specification in the presence of two subscribing witnesses.

PEDRO G. SALOM.

Witnesses:
JOSEPH H. KLEIN,
HENRY HOWSON.